United States Patent
Lee

(10) Patent No.: US 10,644,569 B2
(45) Date of Patent: May 5, 2020

(54) ROTOR AND MOTOR HAVING AN INSULATOR FOR ROTOR TEETH

(71) Applicant: LG INNOTEK CO., LTD., Seoul (KR)

(72) Inventor: Jong Chan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 764 days.

(21) Appl. No.: 15/215,295

(22) Filed: Jul. 20, 2016

(65) Prior Publication Data

US 2017/0025926 A1  Jan. 26, 2017

(30) Foreign Application Priority Data

Jul. 21, 2015 (KR) ........................ 10-2015-0103178

(51) Int. Cl.
*H02K 9/06* (2006.01)
*H02K 1/24* (2006.01)
*H02K 3/52* (2006.01)
*H02K 1/30* (2006.01)
*H02K 1/26* (2006.01)
*H02K 5/20* (2006.01)
*H02K 5/18* (2006.01)

(52) U.S. Cl.
CPC .................. *H02K 9/06* (2013.01); *H02K 1/24* (2013.01); *H02K 1/30* (2013.01); *H02K 3/527* (2013.01); *H02K 1/26* (2013.01); *H02K 5/18* (2013.01); *H02K 5/20* (2013.01); *H02K 2203/12* (2013.01)

(58) Field of Classification Search
CPC ........ F04D 29/5806; H02K 1/24; H02K 1/26; H02K 1/30; H02K 3/527; H02K 5/18; H02K 5/20; H02K 9/06; H02K 2203/12

USPC ...... 310/156.08, 156.09, 194, 62, 63, 64, 89
See application file for complete search history.

(56) References Cited

U.S. PATENT DOCUMENTS

| | | | | |
|---|---|---|---|---|
| 7,608,954 B2 * | 10/2009 | Kojima | ..................... | H02K 1/14 310/45 |
| 8,853,910 B2 * | 10/2014 | Sato | ......................... | H02K 3/24 310/179 |
| 2014/0091670 A1 * | 4/2014 | Chun | ........................ | H02K 3/46 310/214 |
| 2014/0152127 A1 * | 6/2014 | Tang | ......................... | H02K 1/02 310/43 |

(Continued)

FOREIGN PATENT DOCUMENTS

CN        1893225 A      1/2007
CN     101017997 A      8/2007
(Continued)

*Primary Examiner* — Jermele M Hollington
*Assistant Examiner* — Rashad H Johnson
(74) *Attorney, Agent, or Firm* — Birch, Stewart, Kolasch & Birch, LLP

(57) ABSTRACT

Provided is a rotor including a rotor core, a plurality of teeth disposed at an outer side of the rotor core, and an insulator configured to surround the teeth wherein the teeth are detachably coupled to the rotor core, the insulator includes a body configured to surround the teeth, and a blade configured to protrude from at least one of an upper surface and a lower surface of the body, and thereby the number of manufacturing components is reduced and manufacturing costs and the number of manufacturing processes are reduced.

20 Claims, 11 Drawing Sheets

(56) References Cited

U.S. PATENT DOCUMENTS

| | | | | |
|---|---|---|---|---|
| 2014/0339964 | A1* | 11/2014 | Bledsoe | H02K 9/06 |
| | | | | 310/60 R |
| 2015/0303753 | A1* | 10/2015 | Huang | H02K 1/185 |
| | | | | 310/62 |
| 2015/0364975 | A1* | 12/2015 | Lau | H02K 9/22 |
| | | | | 310/62 |
| 2017/0338711 | A1* | 11/2017 | Yu | H02K 1/22 |

FOREIGN PATENT DOCUMENTS

| | | | | |
|---|---|---|---|---|
| CN | 203632382 U | 6/2014 | | |
| JP | 2012-95533 A | 5/2012 | | |
| WO | WO 2004/008603 A3 | 1/2004 | | |
| WO | WO-2004008603 A2 * | 1/2004 | | H02K 1/30 |

\* cited by examiner

ROTOR AND MOTOR HAVING AN INSULATOR FOR ROTOR TEETH

CROSS-REFERENCE TO RELATED APPLICATION

This application claims priority to and the benefit of Korean Patent Application No. 2015-0103178, filed on 21 Jul. 2015, the disclosure of which is incorporated herein by reference in its entirety.

BACKGROUND

1. Field of the Invention

The present invention relates to a rotor and a motor having the same.

2. Discussion of Related Art

Generally, a vehicle includes a starter motor which drives an engine and an alternator which generates electricity using a rotational force of the engine. The starter motor has an ignition switch which is connected to a power supply of a battery by an operation of a driver when the vehicle is started, power is supplied to the starter motor through the connection, and the vehicle is started by the engine being rotated by a driving force generated by the starter motor.

In comparison, an alternating current (AC) power is generated by the alternator being connected to a driving unit of the engine to rotate a rotor while a magnetic field is formed by a driving force of the engine, and thus the battery is charged using a rectifier etc.

Since both of the starter motor and the alternator are configured in a structure having a stator and a rotor, structures of the starter motor and the alternator are very similar to each other and can be operated as a power generator or a motor depending on whether a force or power is applied.

Recently, a belt driven starter generator (BSG) structure capable of functioning as a starter motor and an alternator with a single structure is actively being studied.

Meanwhile, a wound rotor synchronous motor is a motor having teeth which protrude from an outer circumferential surface of a rotor core and around which a coil is wound. The wound motor synchronous motor has not only been mainly used as a generator but has also been recently proposed as a form of a traction motor since a development of a rare earth-free motor has been spotlighted.

However, a motor has to increase the number of wound coils or current to increase torque thereof. However, in the case of a BSG, there is a problem in that an increase in a torque of the motor is limited because there is a limit in increasing the number of wound coils due to spatial constraints and in increasing a current due to a current limit.

Also, an inlet through which a nozzle is inserted into a winding space is formed between teeth of a rotor that are adjacent to each other to perform winding, and coils wound through the inlet may deviate therefrom, and thus the space should be closed with a separate member after the winding. Therefore, there is a problem in which manufacturing time and manufacturing costs are increased.

Also, there is a problem in which manufacturing components and the number of manufacturing processes are increased because a separate fan is pressed and mounted at an upper part of a rotor to cool heat generated in a coil wound around the rotor.

SUMMARY OF THE INVENTION

The present invention is directed to a rotor capable of having increased torque by increasing a space factor of a coil and being easily assembled, and a motor having the same.

The present invention is also directed to a rotor capable of having reduced manufacturing time and costs by removing a member for blocking an inlet through which a nozzle is inserted between teeth of the rotor, and a motor having the same.

The present invention is also directed to a motor capable of having reduced manufacturing time and costs by reducing the number of manufacturing components.

Objectives of the present invention are not limited to the above-mentioned objects. That is, other objectives that are not mentioned may be obviously understood by those skilled in the art to which the present invention pertains from the following description.

According to an aspect of the present invention, there is provided a rotor including a rotor core, a plurality of teeth disposed at an outer side of the rotor core, and an insulator configured to surround the teeth, wherein the teeth are detachably coupled to the rotor core, and the insulator includes a body configured to surround the teeth and a blade configured to protrude from at least one of an upper surface and a lower surface of the body.

The insulator may include a coupling slot concavely formed on a first side surface thereof and a coupling protrusion convexly formed on a second side surface thereof.

The insulator may include a first coupling slot concavely formed at an upper portion of the first side surface and a first coupling protrusion convexly formed at a lower portion of the first side surface.

The insulator may include a second coupling protrusion convexly formed at an upper portion of the second side surface and a second coupling slot concavely formed at a lower portion of the second side surface.

The blade may be obliquely formed to form a receiving angle with respect to a reference line formed in a radial direction from a rotational center of the rotor.

The rotor core may include an assembling slot concavely formed on an outer circumferential surface thereof in an axial direction of the rotor and an assembling protrusion formed at an inner end part of the teeth to be inserted into the assembling slot.

According to another aspect of the present invention, there is provided a motor including a rotating shaft, a rotor through which the rotating shaft passes, and a stator disposed at an outer side of the rotor, wherein the rotor includes a rotor core, a plurality of teeth disposed at an outer side of the rotor core, and an insulator configured to surround the teeth, the teeth are detachably coupled to the rotor core, and the insulator includes a body configured to surround the teeth and a blade configured to protrude from at least one of an upper surface and a lower surface of the body.

The insulator may include a coupling slot concavely formed on a first side surface thereof and a coupling protrusion convexly formed on a second side surface thereof.

The insulator may include a first coupling slot concavely formed at an upper portion of the first side surface and a first coupling protrusion convexly formed at a lower portion of the first side surface.

The insulator may include a second coupling protrusion convexly formed at an upper portion of the second side surface, and a second coupling slot concavely formed at a lower portion of the second side surface.

The blade may be obliquely formed to form a receiving angle with respect to a reference line formed in a radial direction from a rotational center of the rotor.

The rotor core may include an assembling slot concavely formed on an outer circumferential surface thereof in an axial direction of the rotor and an assembling protrusion formed at an inner end part of the teeth to be inserted into the assembling slot.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the invention will be described in detail with reference to the accompanying drawings. Purposes, specific advantages, and novel features of the invention will be made clear from exemplary embodiments and the following detailed descriptions in connection with the accompanying drawings. Terms and words used in this specification and claims are not to be interpreted as limited to commonly used meanings or meanings in dictionaries and should be interpreted as having meanings and concepts which are consistent with the technological scope of the invention based on the principle that the inventors have appropriately defined concepts of terms in order to describe the invention in the best way. In the following description of the present invention, the detailed descriptions of well-known technology related to the present invention will be omitted.

Figure 1:
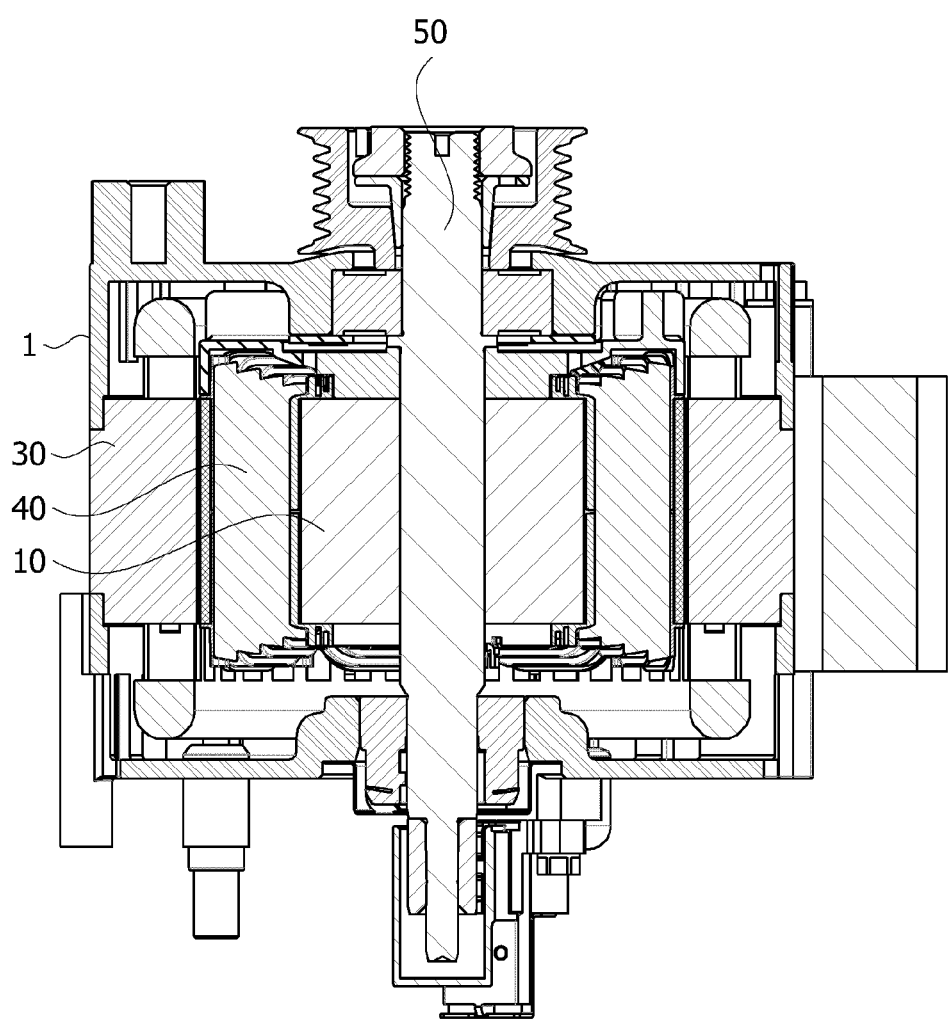
FIG. 1 is a view illustrating a motor according to an embodiment.

FIG. 1 is a view illustrating a motor according to an embodiment.

Referring to FIG. 1, the motor may include a stator 30 provided in a housing 1. A rotor 10 is provided in an inside direction from the stator 30. A coil 40 may be wound around the rotor 10. The coil 40 may induce the rotor 10 to rotate or induce power to be generated by the rotating rotor 10 by causing an electrical interaction with the stator 30.

Specifically, when the motor is operated as a starter motor, the rotor 10 is rotated by an applied driving current and a pulley belt (not shown) connected to a rotating shaft 50 of the rotor 10 rotates so that external components (an engine, etc.) may be operated. In the case of a vehicle, a pulley belt may be connected to a crank shaft of an engine.

Conversely, when the motor is operated as an alternator, the pulley belt (not shown) is rotated by driving the engine and the rotor 10 rotates so that an alternating current (AC) is generated. The generated AC is converted into a direct current (DC) and may be supplied to external components (a battery, etc.).

Figure 2:
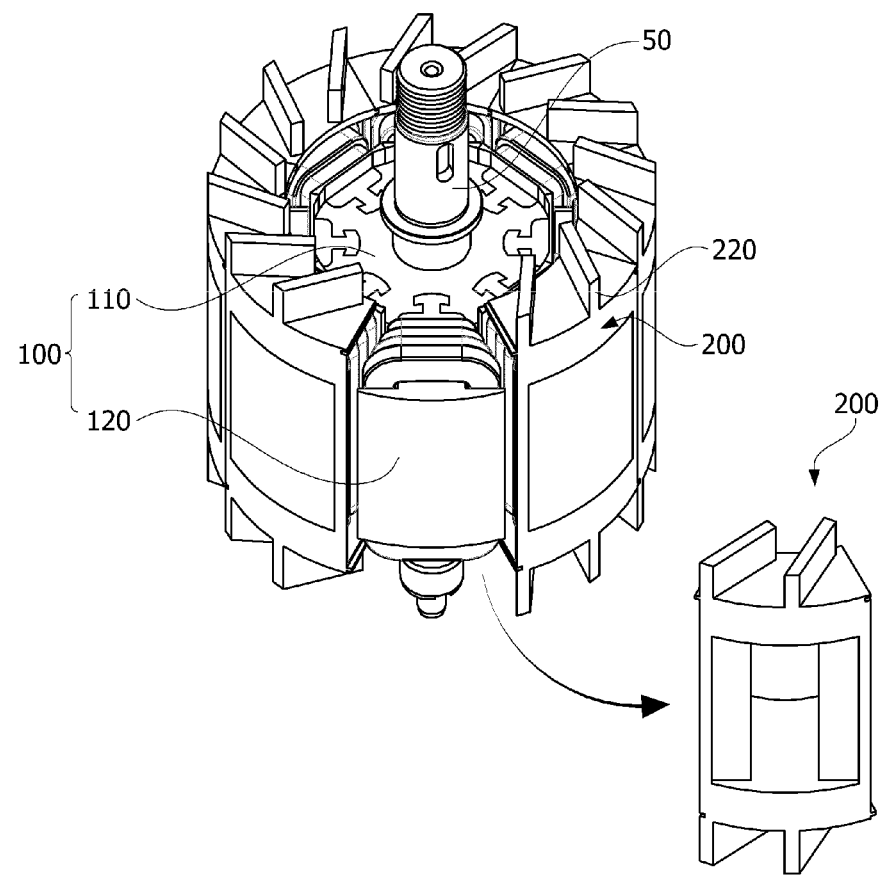
FIG. 2 is a view illustrating a rotor illustrated in FIG. 1.
Figure 3:
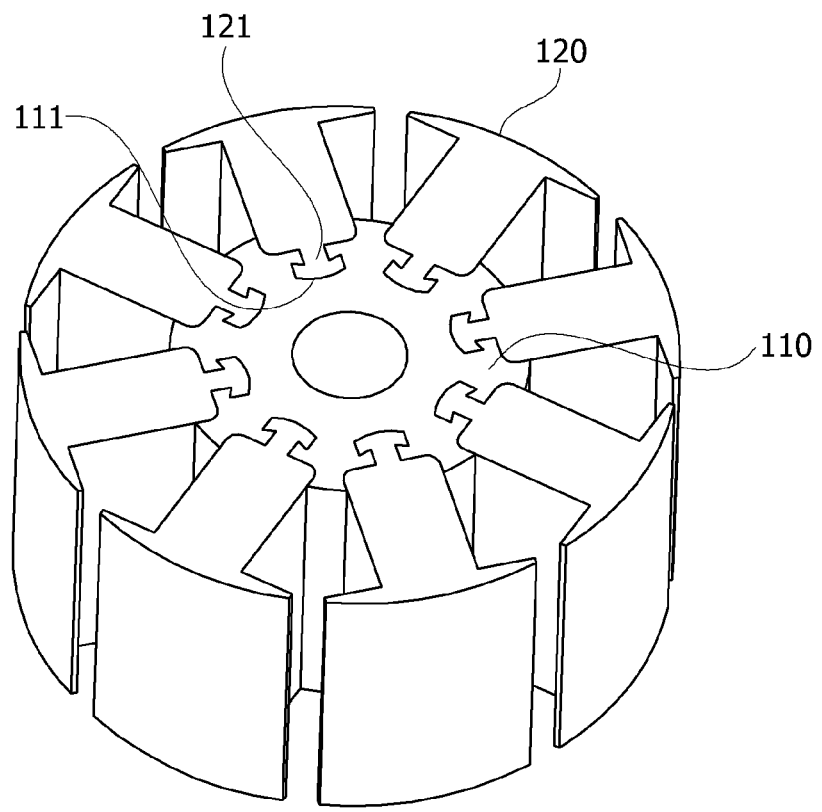
FIG. 3 is a view illustrating the rotor illustrated in FIG. 2.

FIG. 2 is a view illustrating the rotor illustrated in FIG. 1, and FIG. 3 is a view illustrating the rotor illustrated in FIG. 2. In FIGS. 2 and 3, only main features are shown so that the embodiments may be clearly conceptually understood. Accordingly, the drawing may be modified in various forms and may not be significantly limited to the specific forms illustrated in the drawings.

As shown in FIGS. 2 and 3, the rotor 10 according to the embodiment may include a rotor core 110 and teeth 120. The rotor core 110 may be composed of a plurality of plates stacked on each other.

Referring to FIG. 3, a plurality of teeth 120 may be coupled to the rotor core 110. Specifically, the teeth 120 may be detachably coupled to an outer circumferential surface of the rotor core 110. Coils are wound around the teeth 120. The plurality of teeth 120 may be disposed in a circumferential direction of the cylindrical rotor core 110 at regular gaps. The rotating shaft 50 is inserted into the center of the rotor core 110.

Figure 4:
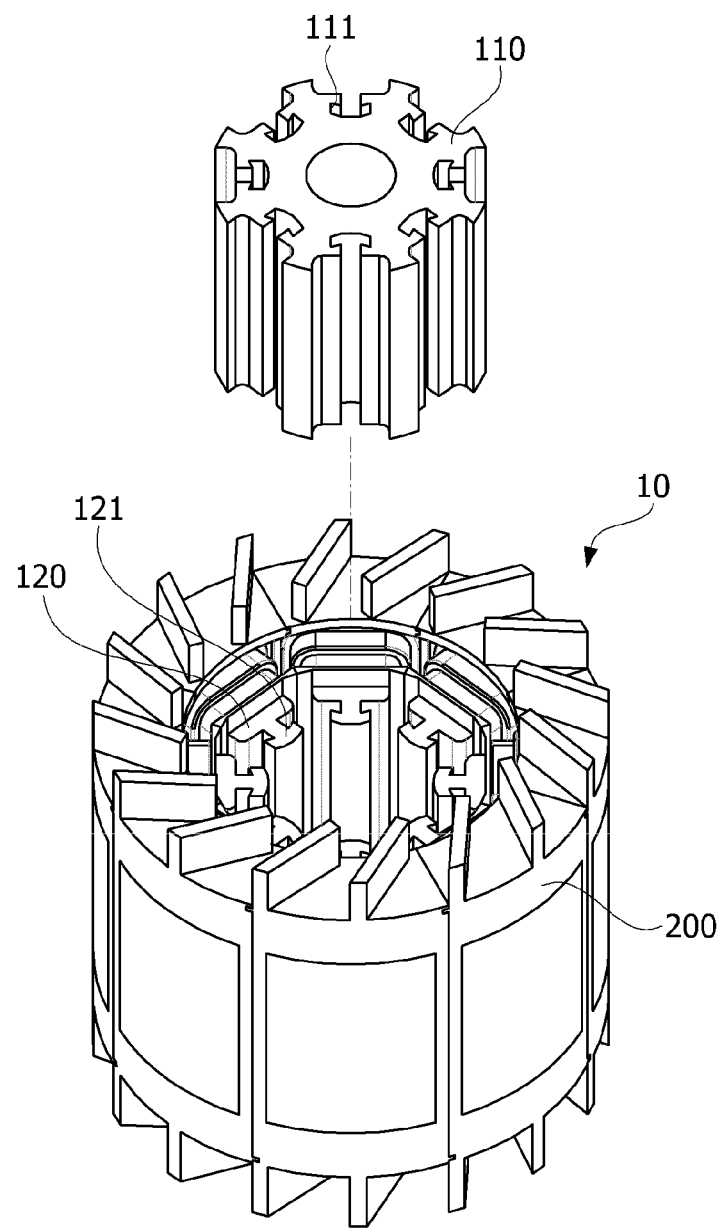
FIG. 4 is a view illustrating a rotor core of the rotor.

FIG. 4 is a view illustrating a rotor core of the rotor.

Referring to FIG. 4, assembling slots 111 may be formed on the outer circumferential surface of the rotor core 110 in an axial direction. Assembling protrusions 121 of the teeth 120 are inserted into the assembling slots 111. The assembling slots 111 may be disposed in the circumferential direction of the rotor core 110 at regular gaps.

Figure 5:
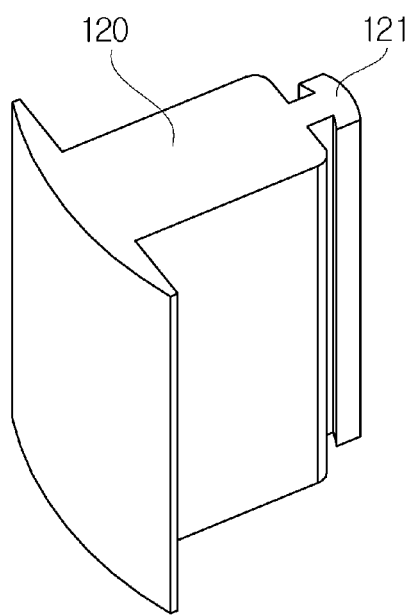
FIG. 5 is a view illustrating teeth of the rotor.

FIG. 5 is a view illustrating the teeth of the rotor.

Referring to FIG. 5, the teeth 120 may have a structure having an arm-shaped body connected to the rotor core 110 and a rim-shaped protrusion formed at a front end of the arm-shaped body. A coil is wound around the arm-shaped body. The assembling protrusions 121 may be formed at inner front ends of the teeth 120. The assembling protrusions 121 may be inserted into the assembling slots 111 of the rotor core 110.

The number of teeth 120 may vary depending on the number of poles of the motor.

Figure 6:
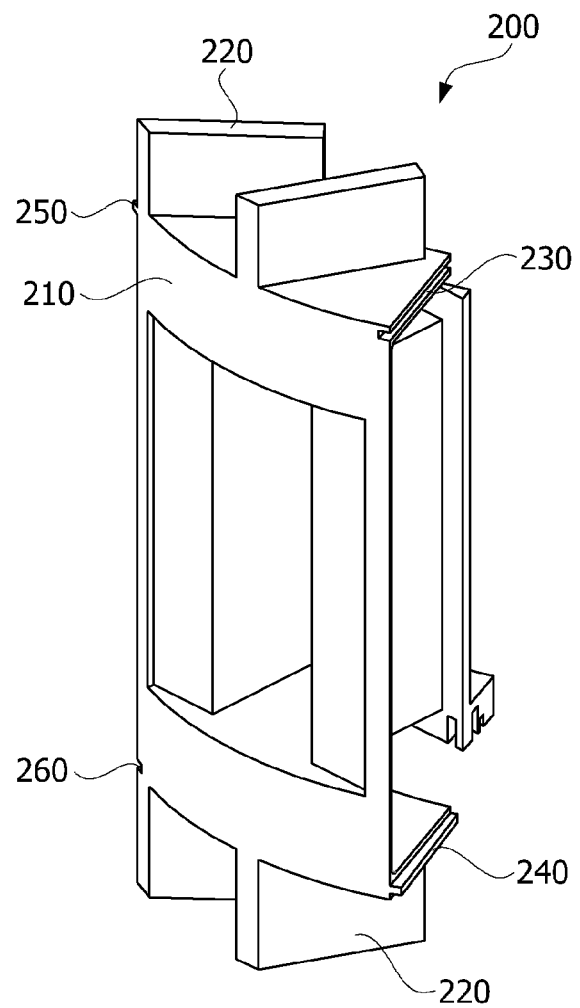
FIG. 6 is a view illustrating an insulator.

FIG. 6 is a view illustrating an insulator.

Referring to FIG. 6, an insulator 200 may be installed at the teeth 120 shown in FIG. 5 to be insulated from the coil. The insulator 200 serves to insulate the coil from the rotor 100 not to generate a current between the coil wound around the teeth 120 and the rotor 100. The insulator 200 may be formed of a resin material.

The insulator 200 may include a body 210 and a blade 220.

The inside of the body 210 forms a space which surrounds the rotor core 110, and a coil may be wound around the outside of the body 210. A guide structure may be provided in the outside and the inside of the body 210.

The blade 220 may be integrally formed to protrude from an upper surface and a lower surface of the body 210. The blade 220 serves to induce an air flow which cools heat of the coil when the rotor 10 rotates.

Figure 7:
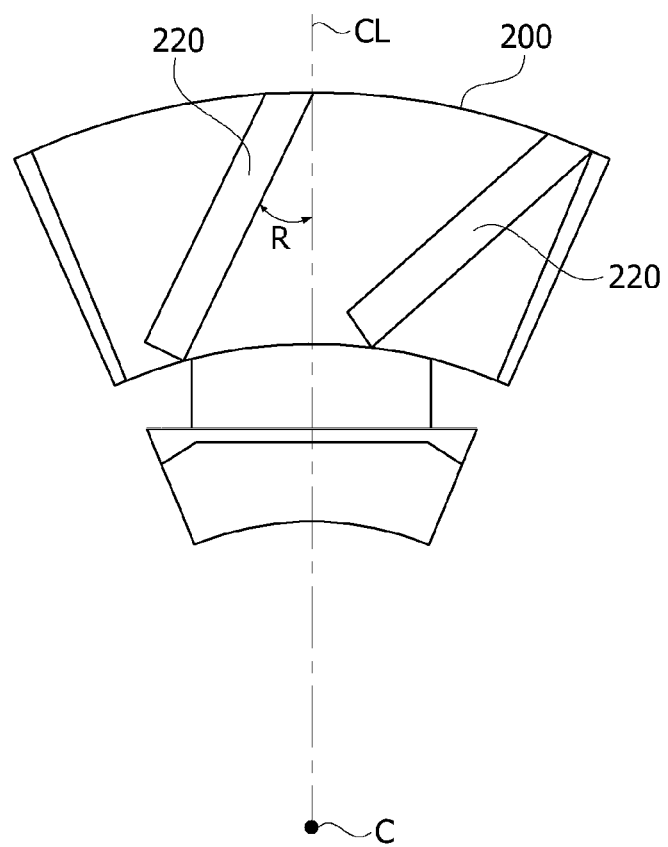
FIG. 7 is a view illustrating a fan.

FIG. 7 is a view illustrating a fan.

Referring to FIG. 7, the blade 220 may be obliquely formed to form a receiving angle R with respect to a reference line CL formed in a radial direction from a rotational center of the rotor 100.

Figure 8:
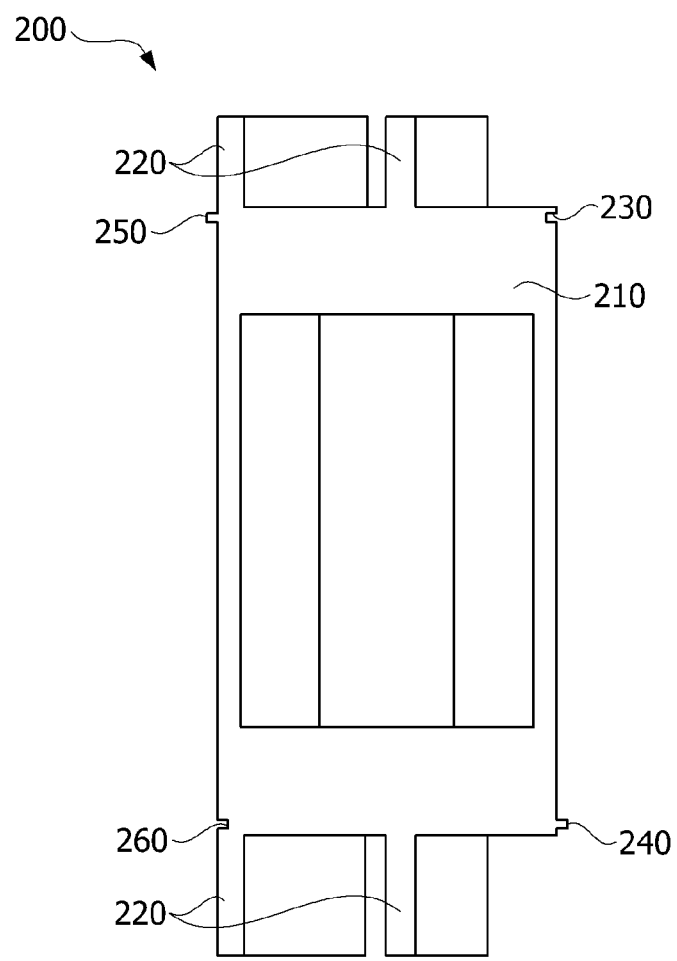
FIG. 8 is a side view of the insulator.

FIG. 8 is a side view of the insulator.

Referring to FIG. 8, the insulator 200 is configured to close a winding space by mutually coupling adjacent insulators 200 to both sides of the body 210 so that the insulator 200 may be configured without a separate cover member closing the winding space.

Basically, a space between outer guides of the adjacent insulators should be secured because a space into which a nozzle for winding is inserted is needed. The space is covered with a separate cover member later. Thus, the coil is prevented from deviating to the outside of the winding space by a centrifugal force caused by a rotation of the rotor. However, a separate cover member should be assembled, and thus there is a problem of a large increase in manufacturing time and cost of a product.

Therefore, the rotor and a motor having the same according to the embodiment can omit a separate cover member and can have configurations for preventing the coil from deviating to the outside of the winding space by mutually abutting and coupling the adjacent insulators 200 having first and second coupling slots 230 and 260 and first and second coupling protrusions 240 and 250 formed on both sides of the body 210.

The first and second coupling slots 230 and 260 and the first and second coupling protrusions 240 and 250 are mutually engaged with each other to close the winding space and increase a mutual coupling ability of the adjacent insulators 200.

The first coupling slot 230 is concavely formed at an upper end of the body 210 with respect to a right side (the right of FIG. 8) of both sides of the body 210.

The first coupling protrusion 240 may be convexly formed at a lower end of the body 210. The first coupling slot 230 and the first coupling protrusion 240 may be formed to be long with respect to a direction perpendicular to an axial direction of the rotor 100. As a result, the adjacent insulator 200 may be formed to be inserted into the first coupling slot 230 in a direction perpendicular to the axial direction of the rotor 100 in a sliding manner.

The second coupling protrusion 250 is convexly formed at the upper end of the body 210 with respect to a left side (the left of FIG. 8) of both sides of the body 210, and the second coupling slot 260 may be concavely formed at the lower end of the body 210. The second coupling protrusion 250 and the second coupling slot 260 may be formed to be long with respect to the direction perpendicular to the axial direction of the rotor 100.

Figure 9:
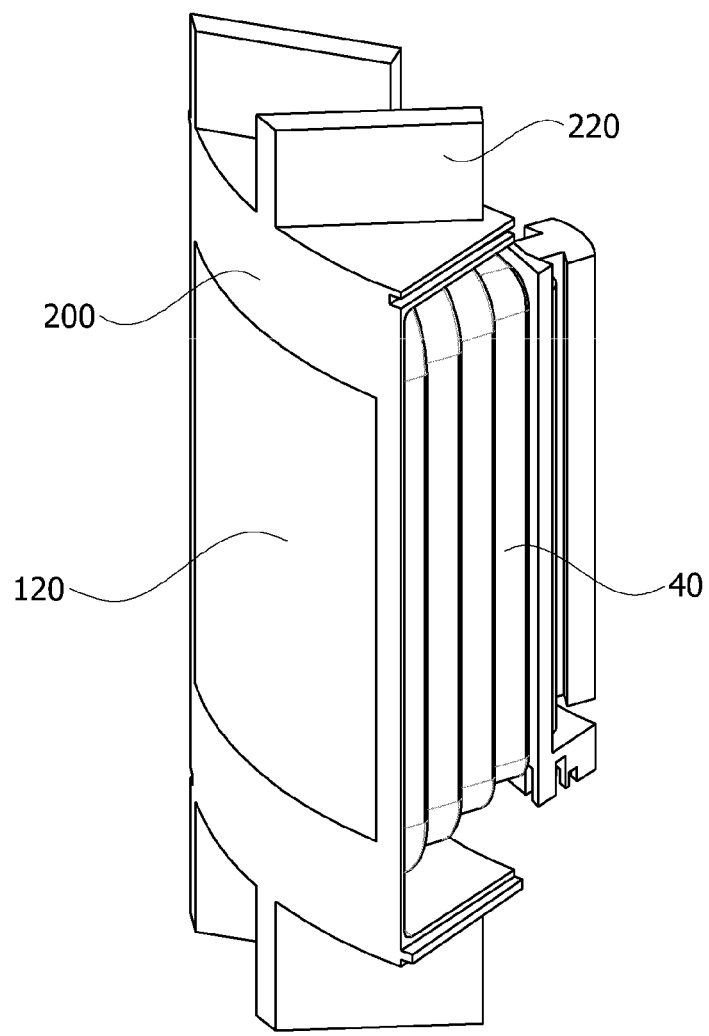
FIG. 9 is a view illustrating teeth on which a coil is wound.

FIG. 9 is a view illustrating teeth on which a coil is wound.

As shown in FIG. 9, the coil 40 may be wound around the teeth 120 while the teeth 120 are separated from the rotor core 110. Winding work is individually performed on the teeth 120, and thus there is no need to form a space into which a nozzle is inserted during the winding work, and the space factor of the coil can be increased.

Figure 10:
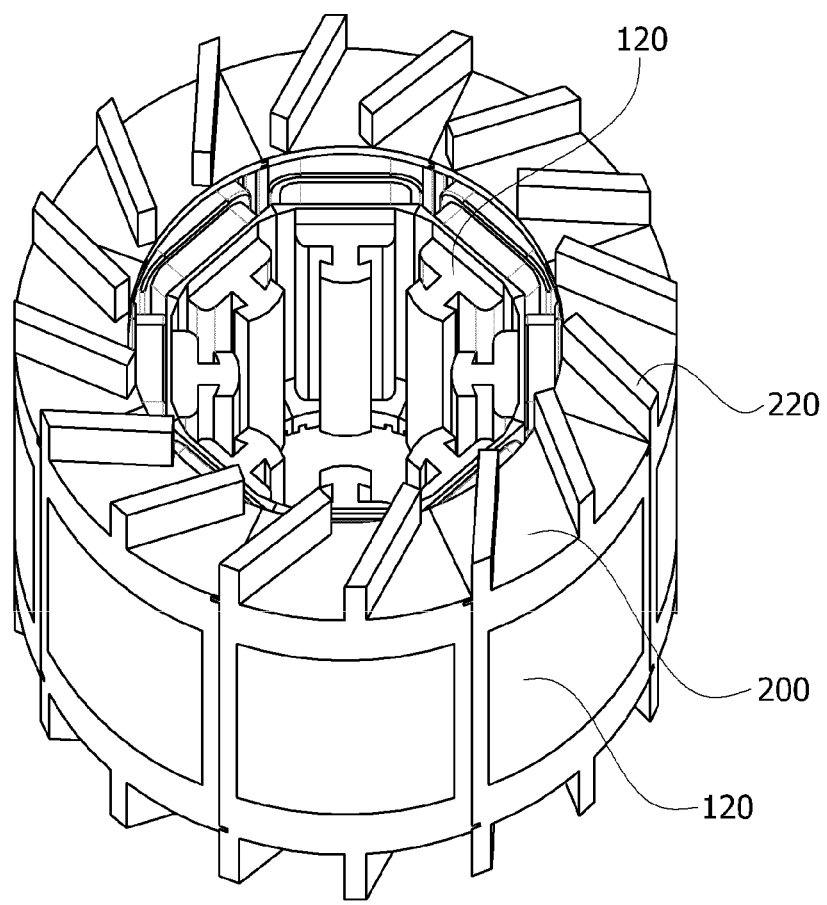
FIG. 10 is a view illustrating a state in which a plurality of teeth are coupled.

FIG. 10 is a view illustrating a state in which a plurality of teeth are coupled to each other.

As shown in FIG. 10, each of the teeth 120 on which winding work is completed may be assembled by being inserted into the adjacent insulators 200 in the direction perpendicular to the axial direction of the rotor 100.

The plurality of teeth 120 formed with the mutually coupled insulators 200 form a circular assembly. When the plurality of teeth 120 form the circular assembly, the blade 220 formed at each of the insulators 200 may be formed as a cooling fan for cooling heat generated in the coil. Therefore, a separate fan is not needed.

Figure 11:
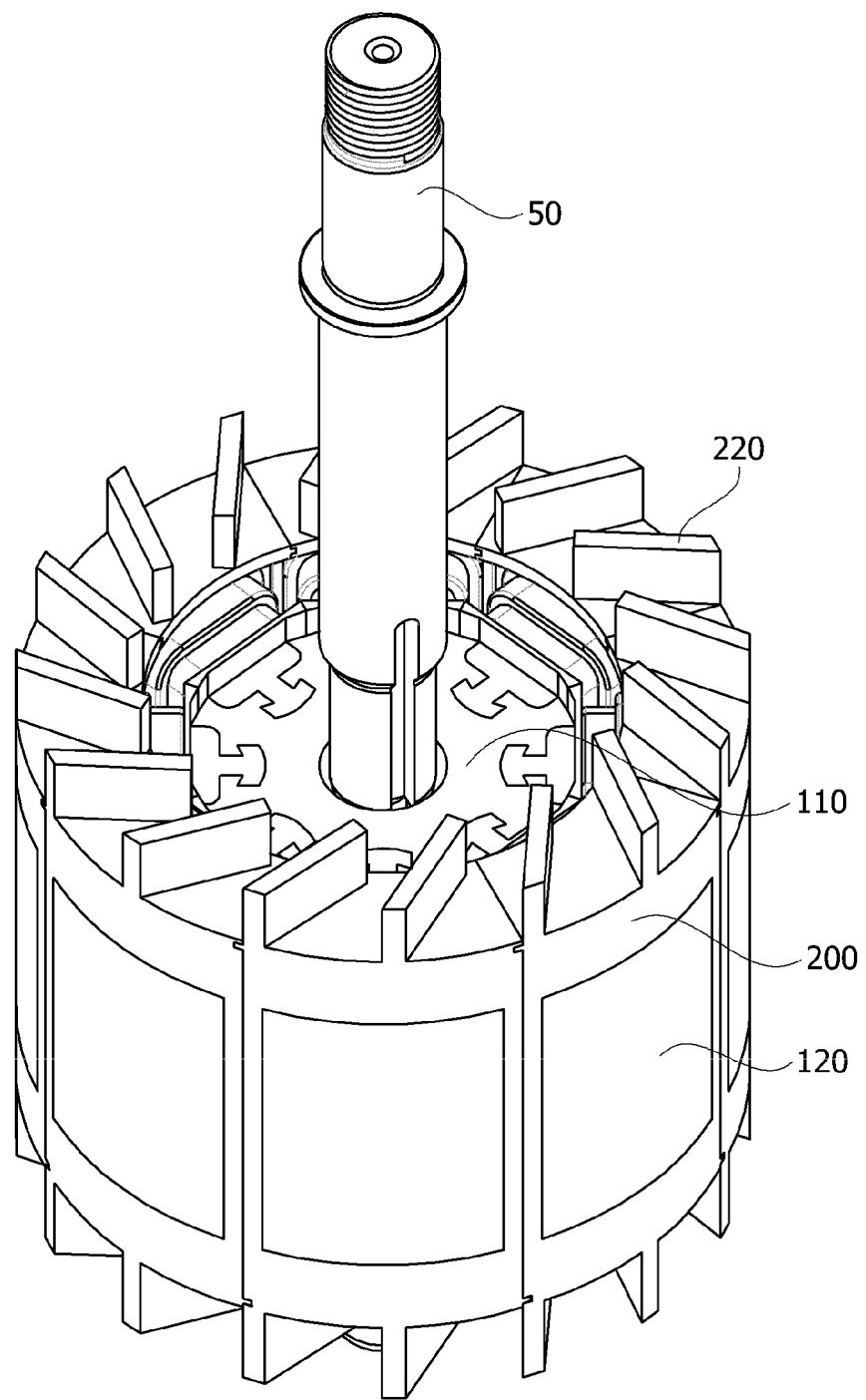
FIG. 11 is a view illustrating a state in which a rotating shaft is pressed and inserted into the rotor core of the rotor.

FIG. 11 is a view illustrating a state in which a rotating shaft is pressed and inserted into the rotor core of the rotor.

Referring to FIG. 11, the rotor core 110 is pressed and inserted into the teeth 120 forming the circular assembly. After that, the rotating shaft 50 is pressed and inserted into the rotor core 110.

The motor according to the embodiment is formed in simple five-operation processes having an operation of inserting each of the teeth 120 into the insulator 200, an individually winding operation, an operation of inserting the adjacent insulators 200, and an operation of pressing and inserting the rotating shaft 50 into the rotor core 110.

According to the embodiment, since the blades are formed at upper and lower portions of the insulator, the number of manufacturing components is reduced so that the manufacturing costs and the number of processes can be reduced.

Also, according to the embodiment, the teeth are formed to be detachable from the rotor core, and the coil is wound around separated teeth. The rotor has a relatively wide winding space unlike the rotor in which a plurality of teeth, around each of which a coil is wound, are integrally formed. Therefore, the space factor of the coil can be increased, and winding work can be easily performed.

Also, according to the embodiment, since winding work is individually performed on each of the teeth, a space into which a nozzle for the winding work is inserted is not needed. The adjacent insulators are mutually coupled to prevent the coil from deviating from the winding space and to close the winding space, and a separate member for covering the nozzle insertion space is omitted so that the manufacturing time and the number of manufacturing processes can be reduced.

The rotor and the motor having the same according to one exemplary embodiment of the present invention have been described above in detail with reference to the accompanying drawings.

While the present invention has been particularly described with reference to exemplary embodiments, it should be understood by those of skilled in the art that various changes, modifications, and replacements may be made without departing from the spirit and scope of the present invention. Therefore, the exemplary embodiments should be considered in a descriptive sense only and not for purposes of limitation. Accordingly, the scope of the invention is not limited by the embodiments. The scope of the invention is defined not by the detailed description of the invention but by the appended claims, and encompasses all modifications and equivalents that fall within the scope of the appended claims.

DESCRIPTION OF SYMBOLS

1: HOUSING
10: ROTOR
30: STATOR
40: COIL
50: ROTATING SHAFT
100: ROTOR
110: ROTOR CORE
111: ASSEMBLING SLOT
120: TEETH
121: ASSEMBLING PROTRUSION
200: INSULATOR
210: BODY
220: BLADE
230: FIRST COUPLING SLOT
240: FIRST COUPLING PROTRUSION
250: SECOND COUPLING PROTRUSION
260: SECOND COUPLING SLOT

What is claimed is:
1. A rotor comprising:
a rotor core;
a plurality of teeth disposed at an outer side of the rotor core;

a coil wound around the rotor; and a plurality of insulators, each insulator surrounding a respective tooth and configured to electrically insulate the coil from the rotor, wherein each insulator among the plurality of insulators engages adjacent insulators among the plurality of insulators, wherein the teeth are detachably coupled to the rotor core, and wherein each insulator includes:
 a body surrounding the respective tooth; and
 a blade protruding in an axial direction from at least one of an upper surface and a lower surface of the body.

2. The rotor of claim 1, wherein each insulator includes a coupling slot concavely formed on a first side surface thereof to engage a first adjacent insulator among the adjacent insulators and a coupling protrusion convexly formed on a second side surface thereof to engage a second adjacent insulator among the adjacent insulators, and wherein the coupling slot and coupling protrusion extend a width of each insulator.

3. The rotor of claim 1, wherein each insulator includes a first coupling slot concavely formed at an upper portion of a first side surface to engage a first adjacent insulator among the adjacent insulators and a first coupling protrusion convexly formed at a lower portion of the first side surface to engage the first adjacent insulator, and wherein the first coupling slot and first coupling protrusion extend a width of each insulator.

4. The rotor of claim 3, wherein each insulator includes a second coupling protrusion convexly formed at an upper portion of a second side surface to engage a second adjacent insulator among the adjacent insulators and a second coupling slot concavely formed at a lower portion of the second side surface to engage the second adjacent insulator, and wherein the second coupling slot and second coupling protrusion extend a width of each insulator.

5. The rotor of claim 1, wherein the blade is obliquely formed to form a receiving angle with respect to a reference line formed in a radial direction from a rotational center of the rotor.

6. The rotor of claim 1, wherein the rotor core includes an assembling slot concavely formed on an outer circumferential surface thereof in an axial direction of the rotor and an assembling protrusion formed at an inner end part of the teeth to be inserted into the assembling slot.

7. The rotor of claim 1, wherein the plurality of teeth extend in a radial direction, and wherein the blade of each insulator protrudes from the body in a direction perpendicular to the radial direction.

8. The rotor of claim 1, wherein the upper surface and the lower surface of the body of each insulator are planar.

9. The rotor of claim 1, wherein an outermost extent of the blade in a radial direction from a rotational center of the rotor and an outermost extent of the plurality of teeth in the radial direction have substantially the same radial position.

10. The rotor of claim 1, wherein the blade comprises an upper blade protruding from the upper surface of the body, and further comprising a lower blade protruding from the lower surface of the body.

11. A motor comprising:
a rotating shaft;
a rotor through which the rotating shaft passes; and
a stator disposed at an outer side of the rotor,
wherein the rotor includes:
a rotor core;

a plurality of teeth disposed at an outer side of the rotor core;

a coil wound around the rotor; and a plurality of insulators, each insulator surrounding a respective tooth and configured to electrically insulate the coil from the rotor, wherein each insulator among the plurality of insulators engages adjacent insulators among the plurality of insulators, wherein the teeth are detachably coupled to the rotor core, and wherein each insulator includes:
 a body surrounding the respective tooth; and
 a blade protruding in an axial direction from at least one of an upper surface and a lower surface of the body.

12. The motor of claim 11, wherein each insulator includes a coupling slot concavely formed on a first side surface thereof to engage a first adjacent insulator among the adjacent insulators and a coupling protrusion convexly formed on a second side surface thereof to engage a second adjacent insulator among the adjacent insulators, and wherein the coupling slot and coupling protrusion extend a width of each insulator.

13. The motor of claim 11, wherein each insulator includes a first coupling slot concavely formed at an upper portion of a first side surface to engage a first adjacent insulator among the adjacent insulators and a first coupling protrusion convexly formed at a lower portion of the first side surface to engage the first adjacent insulator, and wherein the first coupling slot and first coupling protrusion extend a width of each insulator.

14. The motor of claim 13, wherein each insulator includes a second coupling protrusion convexly formed at an upper portion of a second side surface to engage a second adjacent insulator among the adjacent insulators and a second coupling slot concavely formed at a lower portion of the second side surface to engage the second adjacent insulator, and wherein the second coupling slot and second coupling protrusion extend a width of each insulator.

15. The motor of claim 11, wherein the blade is obliquely formed to form a receiving angle with respect to a reference line formed in a radial direction from a rotational center of the rotor.

16. The motor of claim 11, wherein the rotor core includes an assembling slot concavely formed on an outer circumferential surface thereof in an axial direction of the rotor and an assembling protrusion formed at an inner end part of the teeth to be inserted into the assembling slot.

17. The motor of claim 11, wherein the plurality of teeth extend in a radial direction, and wherein the blade of each insulator protrudes from the body in a direction perpendicular to the radial direction.

18. The motor of claim 11, wherein the upper surface and the lower surface of the body of each insulator are planar.

19. The motor of claim 11, wherein an outermost extent of the blade in a radial direction from a rotational center of the rotor and an outermost extent of the plurality of teeth in the radial direction have substantially the same radial position.

20. The motor of claim 11, wherein the blade comprises an upper blade protruding from the upper surface of the body, and further comprising a lower blade protruding from the lower surface of the body.

* * * * *